United States Patent Office 3,240,780
Patented Mar. 15, 1966

3,240,780
AMINO-PYRAZINOYL GUANIDINES
Edward J. Cragoe, Jr., Lansdale, and Philip L. Southwick, Pittsburgh, Pa., assignors to Merck & Co. Inc., Rahway, N.J., a corporation of New Jersey
No Drawing. Filed Dec. 23, 1963, Ser. No. 332,901
13 Claims. (Cl. 260—250)

This is a continuation-in-part of application Serial No. 144,556, filed October 12, 1961.

This invention is concerned with (3-aminopyrazinoyl)guanidine compounds having a halogen or halogen-like substituent attached to the pyrazine nucleus. In particular the invention is concerned with compounds having the structural formula

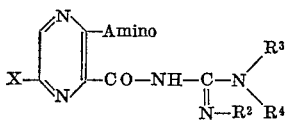

and pharmaceutically acceptable salts thereof, especially the hydrochloride salts, wherein X is halogen or halogen-like, particularly chlorine, bromine, fluorine, iodine, or trihalomethyl as trichloromethyl and particularly trifluoromethyl;
$R^2$ is hydrogen,
  lower alkyl, especially having from 1–5 carbon atoms, as, particularly, methyl but also ethyl through amyl and either branched or straight chained,
  aryl especially phenyl either unsubstituted or having one or more substituents selected from halogen, lower alkyl or lower alkoxy,
  aralkyl especially phenyl-lower-alkyl ($C_{1-3}$) the phenyl radical being unsubstituted or substituted with halogen, lower alklyl or lower alkoxy,
  acyl particularly having the structure R—CO— wherein R is lower alkyl ($C_{1-5}$), aryl, especially phenyl, aralkyl, especially phenyl-lower alkyl ($C_{1-3}$), the phenyl radicals being unsubstituted or substituted with halogen, lower alkyl or lower alkoxy;
$R^3$ is hydrogen,
  lower-alkyl ($C_{1-5}$) either unsubstituted or substituted with
    hydroxy,
    amino or particularly a mono- as di-lower-alkyl-amino, wherein the alkyl groups may be linked to form a hetero structure with the amino-nitrogen to which they are attached such as to form an azacycloalkyl group,
    aryl especially phenyl and either unsubstituted or substituted with halogen, lower alkyl or lower alkoxy,
  aryl especially phenyl either unsubtsituted or substituted with halogen, lower alkyl or lower alkoxy,
  acyl particularly having the structure R—CO— wherein R is lower alkyl ($C_{1-5}$), aryl, especially phenyl, aralkyl, especially phenyl-lower-alkyl ($C_{1-3}$) the pheny radicals being unsubstituted or substituted with halogen, lower alkyl or lower alkoxy,
  tertiary amino such as a di-lower alkylamino or an alkyl-ideneamino or aralkylideneamino;
$R^4$ is hydrogen,
  lower alkyl ($C_{1-5}$) or substituted lower alkyl where the substituent group can be a 3-(3-aminopyrazinoyl)-guanidino of the structure hereinbefore illustrated and defined;
Additionally, when $R^2$ and $R^3$ (or $R^4$) are each lower alkyl, they can be joined together to form a heterocyclic ring with the nitrogens to which they are attached, and likewise when each of $R^3$ and $R^4$ are lower alkyl, they, too, can be joined together to form a heterocyclic ring with the nitrogen atom to which they are attached.

The amino group attached to the 3-position of the above structure is the

group which embraces unsubstituted amino as well as mono- or di-substituted amino groups, the substituent(s) advantageously being an acyl group particularly derived from a lower alkanoic acid, lower alkyl, and also where the alkyl substituents are linked to form a heterocyclic structure with the nitrogen atom to which they are attached.

The compounds of this invention are useful because they possess diuretic and natriuretic properties. They differ from most of the known effective diuretic agents, however, in that the compounds of this invention selectively enhance the excretion of sodium ions without causing an increase in excretion of potassium ions. The potassium loss, which is caused by known diuretics, often results in a severe muscular weakness. Since the compounds of this invention are essentially free of this potassium depletion, they have this decided advantage as diuretics. As diuretic agents, they can be used for the treatment of edema, hypertension and other diseases known to be responsive to this therapy.

It has also been found as another feature of this invention that when co-administered with other diuretic agents known to enhance the elimination of potassium ions along with sodium ions, the novel pyrazinoylguanidines of this invention will reduce the excretion of potassium ions and thus overcome this undesirable property of other diuretic agents. The compounds of this invention, therefore, are useful in combination with other classes of diuretic agents to prevent the loss of potassium which the other diuretics otherwise would cause to be eliminated. In addition, the compounds of this invention are useful by themselves as diuretic and/or saluretic agents.

In some instances it may be desirable to make a salt of these compounds, using a pharmaceutically acceptable acid, and these salts are to be considered as included in this invention and in the scope of the claims.

The products of this invention can be administered to man or animals in the form of pills, tablets, capsules, elixirs, injectable preparations and the like and can comprise one or more of the compounds of this invention as the only essential active ingredient of the pharmaceutical formulation or, as mentioned above, the novel compound(s) can be combined in pharmaceutical formulations with other diuretic agents or, indeed, other therapeutic agents.

The compounds of this invention are advantageously administered at a dosage range of from about 5 mg./day to about 750 mg./day or at a somewhat higher or lower dosage at the physician's discretion, preferably in subdivided amounts on a 2 to 4 times a day regimen.

The compounds of this invention can be made by several different processes one of which may be more useful than another for making a specific compound. In the description of the processes that follow, the radicals X, $R^2$, $R^3$ and $R^4$ are as above defined.

One generally useful process can be represented as follows:

*Method A*

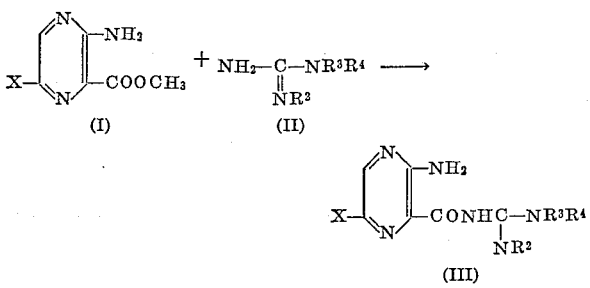

Method A synthesis involves the reaction of a pyrazinoic acid ester of the type illustrated by Compound I with a guanidine of the type illustrated by Compound II. The methyl ester is shown for illustrative purposes only since the ester may be that of certain other alcohols, especially lower aliphatic alcohols. It will be noted that this alkoxy (ester) radical does not appear in the desired end product.

Synthesis by Method A is preferably carried out under anhydrous conditions either with or without a solvent such as methanol, ethanol, isopropyl alcohol or other solvents. The reaction may be carried out at room temperature or by heating on a steam bath for 1 minute to 2 hours or longer. The desired product usually is recovered from the cooled reaction mixture by trituration with water. Purification frequently is carried out by converting the product to a salt which can be recrystallized or the base can be regenerated by addition of aqueous alkali.

Compounds of Formula III above wherein $R^2$ and $R^3$ are each an acyl group (RCO—, R having the meaning assigned above) preferably are prepared by treating the (3-aminopyrazinoyl)guanidine with an acyl halide in a basic medium such as in the presence of a tertiary amine advantageously pyridine, quinoline, triethylamine and the like.

Another method which is useful in preparing compounds of this invention having an acyl substituent attached to the 3-amino group (which, if desired, can be removed by hydrolysis) can be illustrated as follows. This method is also useful if one desires to introduce an acyl substituent in the guanidine moiety (i.e. as a group represented by $R^3$).

*Method B*

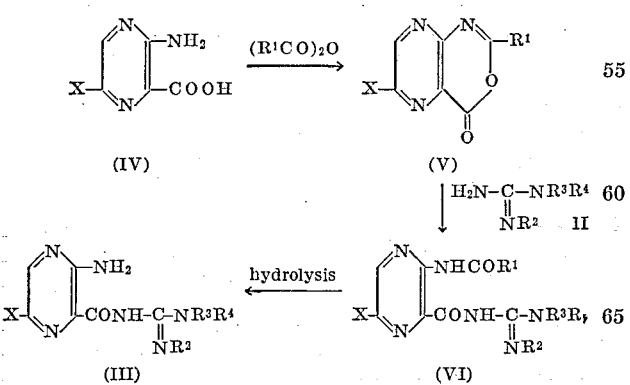

When Compound IV is heated with a lower alkanoic acid anhydride ($R^1CO$—O—CO—$R^1$) a 2-alkyl-4H-pyrazino[2,3-d][1,3]oxazin-4-one (Compound V) is obtained. To obtain the compound V in which $R^1$ equals hydrogen, Compound IV is heated with a mixture of formic acid and acetic anhydride. Compound V then is dissolved in a solvent such as ethyl acetate, for example, and is heated in an atmosphere of nitrogen with the guanidine (Compound II) to produce Compound VI. Compound VI will be recognized as one of the compounds of the invention having an acyl radical attached to the amino group in the 3-position of the nucleus. This acyl group can be removed readily by hydrolysis to form Compound III.

The intermediate 3-aminopyrazinoic acid esters, in most instances, are novel compounds. The esters are prepared by a number of different methods which are illustrated below. Some of the esters can be prepared by any one of several of the methods described; with others certain methods are preferable and with a few esters one particular method is specific for their synthesis.

As the details concerning the actual reaction conditions are provided in the examples, the reaction scheme for each of the preferred procedures is provided without discussion. Each step, however, is carried out by a well-known procedure unless critical conditions are noted.

*Method I.—Synthesis of methyl 2-amino-6-(or 5)-trifluoromethylpyrazinoate*

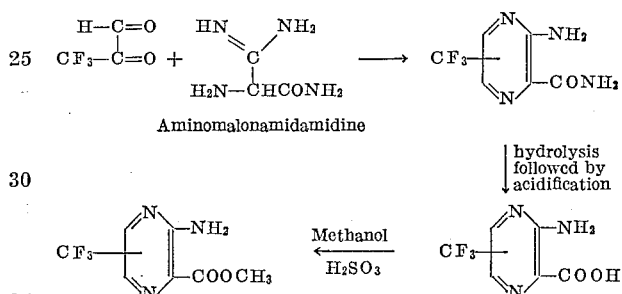

*Method II.—Preparation of methyl 2-amino-6-halopyrazinoates*

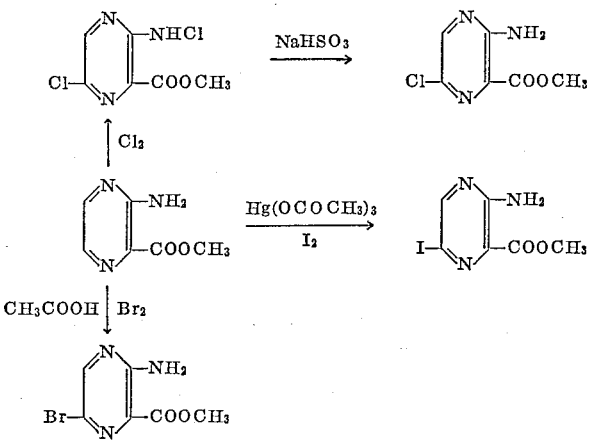

*Method III.—Hydrolysis of the esters (described elsewhere)*

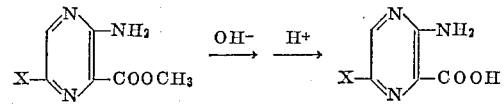

The intermediate pyrazinoic acids required in the synthesis of 4-H-pyrazino[2,3-d][1,3]oxazin-4-ones (V) which are used in Method B are prepared as illustrated in Method III above.

The following examples are illustrative of the methods by which the products of this invention can be prepared and are not to be considered as limiting the invention to the particular procedural conditions employed or to the particular compounds prepared thereby.

EXAMPLE 1.—(3-AMINO-6-CHLOROPYRAZIN-OYL)GUANIDINE

Step A

*Preparation of methyl 3-amino-6-chloropyrazinoate.*—A 5-liter, 3-necked flask equipped with a mechanical stirrer, thermometer and gas inlet tube is charged with a warm (about 38° C.) mixture of water (3180 ml.) and glacial acetic acid (750 ml.) and methyl 3-aminopyrazinoate (90 g., 0.588 mole) then is added. The stirrer is started and the mixture heated to 41° C. which causes nearly all the ester to dissolve. The solution then is cooled to just below 40° C. via an ice bath. With vigorous stirring, chlorine (about 140 g.) is passed through the solution over a period of 25 minutes. A precipitate begins to form after five minutes and becomes quite voluminous by the end of the reaction. The temperature drops to 20–25° C. during the reaction. The nearly white precipitate, which is methyl 3-chloroamino-6-chloropyrazinoate, is removed by filtration and washed with a small amount of ice water. A small amount of this material, when recrystallized from warm acetic acid, melts at 142° C. (dec.)

*Analysis.*—Calculated for $C_6H_5Cl_2N_3O_2$: C, 32.46; H, 2.27; N, 18.93; Cl (total), 31.94, Cl (active), 15.97. Found: C, 32.82; H, 2.34; N, 18.90; Cl (total), 32.09, Cl (active), 16.06.

The moist methyl 3-chloroamino-6-chloropyrazinoate and a solution of sodium bisulfite (150 g.) in water (900 ml.) are placed in a 4-liter beaker and stirred mechanically for one-half hour. The temperature of the mixture is maintained at 25° C. by addition of ice. The light yellow methyl 3-amino-6-chloropyrazinoate is removed by filtration, suspended in 150 ml. of ice water and filtered. This process is repeated twice with 150 ml. portions of ice water and once with a 50 ml. portion of cold isopropyl alcohol. After drying in the air there is obtained 60 g. (55%) of methyl 3-amino-6-chloropyrazinoate, M.P. 159–161° C.

*Analysis.*—Calculated for $C_6H_6ClN_3O_2$: C, 38.42; H, 3.22; N, 22.40; Cl, 18.90. Found: C, 38.81; H, 3.54; N, 22.83; Cl, 18.39.

Step B

*Preparation of (3-amino-6-chloropyrazinoyl)guanidine.*—A 3-liter, 3-necked flask, fitted with a mechanical stirrer, thermometer and gas inlet tube is charged with absolute alcohol (1815 ml.) and then flushed with dry nitrogen. Clean sodium (13.6 g., 0.59 mole) is introduced and the hydrogen allowed to escape through a bubbler to maintain a dry atmosphere. After the sodium dissolves, guanidine hydrochloride (0.67 mole) is added to the solution while maintaining a nitrogen atmosphere. The mixture is stirred for several minutes during which the guanidine hydrochloride dissolves and sodium chloride separates. Methyl 6-chloro-3-aminopyrazinoate (51.5 g., 0.274 mole) is added and the stirring mixture heated to 60° C. then allowed to cool spontaneously to room temperature over a period of 2 hours. The mixture is cooled to 18° C., filtered and the residue washed with absolute alcohol and air dried. This product is a mixture of (3-amino-6-chloropyrazinoyl)guanidine and sodium chloride. This material is suspended in water (5440 ml.) at 60° C., and the pH adjusted to 3 by adding 2.5 N hydrochloric acid (about 115 ml.) with vigorous stirring. A small amount of insoluble material is removed by filtration and the clear yellow filtrate stirred and adjusted to pH 8 with 5% aqueous sodium hydroxide (about 200 ml.). While stirring, the suspension is cooled to 18° C., filtered and the residue washed with water until the alkali is removed. After drying in the air the yield of bright yellow (3-amino-6-chloropyrazinoyl)guanidine is 50.7 g. (86%), M.P. 238° C. (dec.).

*Analysis.*—Calculated for $C_6H_7ClN_6O$: C, 33.58; H, 3.29; N, 39.16. Found: C, 33.60; H, 3.39; N, 39.04.

EXAMPLE 2.—(3-AMINO-6-CHLOROPYRAZINOYL) GUANIDINE HYDROCHLORIDE (3-amino-6-chloropyrazinoyl)guanidine (2 g., 0.0093 mole) is suspended in water (60 ml.), the mixture stirred and 6 N hydrochloric acid added dropwise until the solution tests slightly acid as measured by "alkacid" paper. The mixture is warmed slightly to effect solution, filtered and 6 N hydrochloric acid (4 ml.) added to the filtrate. The solution then is cooled to 5° C. in a salt-ice mixture and the yellow crystalline product removed by filtration. After drying, there is obtained 2.2 g. (96%) of (3-amino-6-chloropyrazinoyl)guanidine hydrochloride, M.P. 286° C. (dec.) when inserted in a bath preheated to 282° C. and heating at a rate of 1° C./5 sec.

*Analysis.*—Calculated for $C_6H_7Cl_2N_6O$: C, 28.70; H, 3.21; N, 33.47; Cl, 28.24. Found: C, 28.89; H, 3.21; N, 33.72; Cl, 28.22.

EXAMPLE 3.—(3-AMINO-6-BROMOPYRAZINOYL) GUANIDINE

A dry 200 ml. round-bottom flask, fitted with a mechanical stirrer, gas-inlet tube and reflux condenser protected with a drying tube is flushed with dry nitrogen and absolute methanol (35 ml.) is added. Clean sodium (0.46 g., 0.02 mole) is introduced and as soon as the reaction terminates guanidine hydrochloride (1.9 g., 0.02 mole) in methanol (35 ml.) is added. After stirring for 10 minutes, methyl 3-amino-6-bromopyrazinoate (4.6 g., 0.02 mole) is added and the mixture stirred and refluxed on a steam bath for 30 minutes. After stirring for an additional hour at room temperature, the stirred reaction mixture is treated with water (150 ml.). The solid product that separates is removed by filtration, washed with a little water and dried at room temperature. The crude (3-amino-6-bromopyrazinoyl)guanidine obtained is suspended in water (30 ml.), stirred and adjusted to pH 3 by the addition of 3 N hydrochloric acid. After warming the mixture to 50° C. a slight amount of insoluble material is removed by filtration and the clear yellow filtrate is stirred and adjusted to pH 8 by the addition of 3 N sodium hydroxide. The bright yellow (3-amino-6-bromopyrazinoyl)guanidine then is removed by filtration. The filter cake is reduced to fine particle size, suspended in water, filtered and dried at room temperature, yielding 2.6 g. (52%) of product, M.P. 234–234.5° C. (dec.).

*Analysis.*—Calculated for $C_6H_7BrN_6O$: C, 27.82; H, 2.72; N, 32.44. Found: C, 27.99; H, 2.90; N, 31.98.

Alternate methods for preparing the product of Example 3, which also can be employed for the preparation of other pyrazinoylguanidine compounds of this invention are described in the following Examples 4–6. Additional methods are described in Examples 7–25.

EXAMPLE 4.—(3-AMINO-6-BROMOPYRAZINOYL)-GUANIDINE

Dry guanidine (0.1 mole) is prepared by dissolving clean sodium (2.3 g., 0.1 mole) in dry methanol (50 ml.) and adding dry guanidine hydrochloride (9.6 g., 0.1 mole) as described above in Example 3. The sodium chloride that separates is removed by filtration under anhydrous nitrogen and the methanol then is removed from the filtrate by distillation in vacuo until a viscous syrup remains.

Methyl 3-amino-6-bromopyrazinoate (4.64 g., 0.02 mole) that has been pulverized and thoroughly dried is added to the guanidine and the mixture heated on a steam bath for 5 to 6 minutes under anhydrous conditions, then quickly cooled and triturated with water (70 ml.). The product is removed by filtration, washed with a little water and dried in air to yield 4.55 g. (88%) of (3-amino-6-bromopyrazinoyl)guanidine, M.P. 231–231.5° C. (dec.). This material when reprecipitated by formation of the soluble hydrochloride salt followed by treatment with sodium hydroxide as described in Example 3 gives 4.0 g. (78%) of product, M.P. 234–234.5° C. (dec.).

EXAMPLE 5.—(3-AMINO-6-BROMOPYRAZINOYL)-GUANIDINE

Step A

*Preparation of (3-aminopyrazinoyl)guanidine.*—A solution of guanidine (0.02 mole) is prepared by dissolving clean sodium (0.46 g., 0.02 mole) in dry isopropyl alcohol (40 ml.) under anhydrous conditions in an atmosphere of dry nitrogen. Guanidine hydrochloride (2.0 g., 0.021 mole) is added and the mixture stirred for 10 minutes. The sodium chloride that forms is filtered off under anhydrous conditions and the filtrate treated with methyl 3-aminopyrazinoate (3.06 g., 0.02 mole). After stirring for 1½ hours under anhydrous conditions in an atmosphere of dry nitrogen, the yellow solid that separates is removed by filtration and dried to give 2.2 g. (61%) of (3-aminopyrazinoyl)guanidine, M.P. 193–4° C. (dec.). Recrystallization from isopropyl alcohol gives material melting at 200–202° C. (dec.).

*Analysis.*—Calculated for $C_6H_8ON_6$: C, 40.00; H, 4.48; N, 46.65. Found: C, 40.24; H, 4.59; N, 46.70.

Step B

*Preparation of (3-amino-6-bromopyrazinoyl)guanidine.*—(3-aminopyrazinoyl)guanidine (1.6 g., 0.0089 mole) is placed in a 100 ml., 3-necked flask fitted with a thermometer, mechanical stirrer and dropping funnel. The solid is suspended in water (50 ml.), the stirrer started and 2.5 N hydrobromic acid added dropwise until the solid dissolves. Bromine (1.6 g., 0.01 mole), dissolved in glacial acetic acid (5 ml.), is added dropwise to the stirring solution over a 15 minute period while the temperature is maintained at 25° C. After stirring another 15 minutes, the solution is adjusted to pH 8 with 10 N sodium hydroxide and the crude product is reprecipitated as described in Example 3 to give pure (3-amino-6-bromopyrazinoyl)guanidine, M.P. 234–234.5° C. (dec.), yield 1.5 g. (65%).

EXAMPLE 6.—(3-AMINO-6-BROMOPYRAZINOYL)-GUANIDINE

Step A

*Preparation of (3-aminopyrazinoyl)guanidine.*—Dry guanidine (0.04 mole) is prepared by dissolving clean sodium (0.92 g., 0.04 mole) in dry methanol (20 ml.) followed by the addition of guanidine hydrochloride (3.84 g., 0.04 mole) and the sodium chloride formed is removed by filtration in an atmosphere of anhydrous nitrogen and then the methanol is removed from the filtrate by distillation in vacuo. Methyl 3-aminopyrazinoate (3.06 g., 0.02 mole) is added to the residual guanidine and the mixture warmed on a steam bath for 3 to 5 minutes. After cooling the reaction mixture, triturating with water and purifying as described in Example 5, Step A, there is obtained 1.6 g. (44%) of (3-aminopyrazinoyl)-guanidine, M.P. 200–202° C.

Step B

*Preparation of (3-amino-6-bromopyrazinoyl)guanidine.*—(3-aminopyrazinoyl)guanidine (1.6 g., 0.0089 mole) is brominated by the method described in Example 5, Step B, yielding pure (3-amino-6-bromopyrazinoyl)-guanidine, M.P. 234–234.5° C. (dec.).

EXAMPLE 7.—(3-AMINO-6-BROMOPYRAZINOYL) GUANIDINE HYDROCHLORIDE (3-amino-6-bromopyrazinoyl)guanidine (500 mg., 0.0019 mole) is suspended in water (20 ml.) and a few drops of 6 N hydrochloric acid added. The suspension then is warmed to 50° C. with stirring to effect solution, the solution then filtered and the filtrate treated with more 6 N hydrochloric acid (1 ml.) and cooled to 5° C. (3-amino-6-bromopyrazinoyl)guanidine hydrochloride separates as yellow needles, yield 500 mg., M.P. 265° C. (dec.).

*Analysis.*—Calculated for $C_6H_8BrClN_6O$: C, 24.38; H, 2.73; Br, 27.03; Cl, 12.00. Found: C, 24.01; H, 3.13; Br, 26.73; Cl, 11.67.

EXAMPLE 8.—(3-AMINO - 6 - IODOPYRAZINOYL) GUANIDINE

Step A

*Preparation of methyl 3-amino - 6 - iodopyrazinoate.*—Methyl 3-aminopyrazinoate (30.6 g., 0.2 mole) is suspended in 500 cc. of water. Mercuric acetate (39.8 g., 0.125 mole) is added, and the mixture stirred and heated on the steam bath while a solution of 50.8 g. (0.2 mole) of iodine in 250 cc. of warm dioxane is rapidly added. The reaction mixture is stirred and heated for 40 minutes and then cooled and poured into 600 cc. of a 15% solution of potassium iodide in water. The solid product which precipitates is collected and recrystallized from 150 cc. of acetic acid to give 13.5 g. of methyl 3-amino-6-iodopyrazinoate, M.P. 199–201.5° C. A small sample recrystallized for analysis had a M.P. 200–202° C.

*Analysis.*—Calculated for $C_6H_6IN_3O_2$: C, 25.82; H, 2.17; N, 15.06; I, 45.48. Found: C, 26.18; H, 2.14; N, 14.81; I, 44.89.

Step B

*Preparation of (3-amino-6-iodopyrazinoyl)guanidine.*—Guanidine hydrochloride (5.0 g., 0.052 mole) is added to a solution of 1.0 g. (0.044 atom) of sodium in 20 cc. of methanol. The methanol is removed by vacuum distillation and 2.8 g. (0.01 mole) of methyl 3-amino-6-iodopyrazinoate added. The thick mixture is stirred for 30 minutes at room temperature during which time it sets to a heavy paste. Ice water then is added and the insoluble product collected and dissolved in a mixture of 20 cc. of 5% hydrochloric acid and 60 cc. of water. The solution is filtered, treated with 5 cc. of concentrated hydrochloric acid and chilled to precipitate the hydrochloride salt of the product. This salt is collected and dissolved in 60 cc. of warm water, filtered and made basic with 5% sodium hydroxide solution, whereupon (3-amino-6-iodopyrazinoyl)guanidine separates in pure condition, M.P. 226–227° C. (dec.).

*Analysis.*—Calculated for $C_6H_7IN_6O$: C, 23.54; H, 2.31; N, 27.46; I, 41.46. Found: C, 23.68; H, 2.27; N, 27.19; I, 41.30.

EXAMPLE 9.—[3 - AMINO - 6(OR 5-) - TRIFLUOROMETHYLPYRAZINOYL]GUANIDINE

Step A

*Preparation of 3-amino-6(or 5-)-trifluoromethylpyrazinamide.*—A mixture of 1,1,1-trifluoro-3,3-dibromopropanone (97.83 g., 0.363 mole), sodium acetate trihydrate (98.60 g., 0.725 mole) and water (305 ml.) is heated, with stirring, to 100° C. over a period of 20 minutes. After maintaining the temperature at 100° C. for an additional 5 minutes, the reaction solution is immediately chilled to 0° C. in an ice bath. This solution is added to a solution of aminomalonamidamidine dihydrochloride (68.51 g., 0.363 mole) in water (720 ml.) at 0° C.

in a reaction vessel where a nitrogen atmosphere is maintained. The pH of the reaction mixture is immediately adjusted to 8–9 by the addition of about 140 ml. of concentrated ammonium hydroxide. During the next 30 minutes while stirring at 5–10° C., additional concentrated ammonium hydroxide is added to maintain pH 8–9. The mixture is removed from the cooling bath and stirred at room temperature for 20 hours while maintaining a nitrogen atmosphere. The resulting yellow solid is extracted with boiling acetonitrile to remove an insoluble material, and the acetonitrile extracts are concentrated to dryness under reduced pressure. After two recrystallizations from acetic acid, there is obtained 20 g. (27%) of 3-amino-6(or 5-) - trifluoromethylpyrazinamide, in the form of a yellow solid, M.P. 195–196° C.

*Analysis.*—Calculated for $C_6H_5F_3N_4O$: C, 34.96; H, 2.44; F, 27.65; N, 27.18. Found: C, 35.39; H, 2.71; F, 27.53; N, 27.19.

Step B

*Preparation of 3-amino-6(or 5-)-trifluoromethylpyrazinoic acid.*—Finely ground 3-amino-6(or 5-)-trifluoromethylpyrazinamide (18.55 g., 0.09 mole) and 5% aqueous sodium hydroxide (740 ml.) are mixed and heated on a steam bath with stirring for 10 minutes. The resulting yellow solution is immediately chilled in an ice bath and made acid to Congo red test paper by the addition of 6 N hydrochloric acid. After thoroughly washing with water and drying, there is obtained 17.78 g. (95%) of 3-amino-6(or 5-)-trifluoromethylpyrazinoic acid, in the form of a yellow solid, M.P. 185–186° C. (dec.).

This solid can be recrystallized from toluene.

*Analysis.*—Calculated for $C_6H_4F_3N_3O_2$: C, 34.79; H, 1.95; N, 20.29. Found: C, 35.10; H, 1.95; N, 20.23.

Step C

*Preparation of methyl 3 - amino - 6(or 5-)-trifluoromethylpyrazinoate.*—To a solution of dry hydrogen chloride gas (495 g.) dissolved in anhydrous methanol (1650 ml.), is added finely ground 3-amino-6(or 5-)-trifluoromethylpyrazinoic acid (16.57 g., 0.08 mole) and the resulting yellow solution is stirred at room temperature for 19 hours. The reaction solution is concentrated to dryness under reduced pressure and the residue treated with water (150 ml.) and while cooling, made basic by the addition of excess saturated sodium bicarbonate solution. After thoroughly washing with water and drying, there is obtained 17.12 g. (97%) of methyl 3-amino-6(or 5-)-trifluoromethylpyrazinoate in the form of a yellow solid, M.P. 194.5–196° C. One recrystallization from methanol gives the product in the form of yellow needles, M.P. 195.5–196.5° C.

*Analysis.*—Calculated for $C_7H_6F_3N_3O_2$: C, 38.02; H, 2.73; F, 25.77; N, 19.00. Found: C, 38.20; H, 2.64; F, 25.84; N, 18.91.

Step D

*Preparation of [3 - amino - 6(or 5-)-trifluoromethylpyrazinoyl]guanidine.*—To a solution of sodium (0.24 g. 0.0105 mole) dissolved in anhydrous methanol (50 ml.), is added finely ground guanidine hydrochloride (1.05 g., 0.011 mole). The mixture is stirred for 10 minutes to complete the reaction and methyl 3-amino-6(or 5-)-trifluoromethylpyrazinoate (2.21 g., 0.01 mole) added. The reaction mixture is stirred at room temperature for 30 minutes and then heated under reflux for 15 minutes. The resulting solution is concentrated to a syrup under reduced pressure and the residue suspended in water, filtered and the solid washed with water. The solid free base is suspended in water (15 ml.), the pH adjusted to 3.0 by the addition of 6 N hydrochloric acid, and the mixture filtered to remove some insoluble material. The filtrate is treated with concentrated hydrochloric acid (2 ml.) and, after chilling in an ice bath, the solid hydrochloride that separates is collected by filtration. The yellow hydrochloride is dissolved in warm water (20 ml.) and the free base is precipitated by the addition of sufficient 5% aqueous sodium hydroxide to give a pH 10.0 to the supernatant solution. After thoroughly washing with water and drying, there is obtained 0.65 g. (26%) of [3-amino-6-(or 5-)-trifluoromethylpyrazinoyl] guanidine in the form of a light yellow solid, M.P. 222–223° C. (dec.).

*Analysis.*—Calculated for $C_7H_7F_3N_6O$: C, 33.88; H, 2.84; F, 22.97; N, 33.87. Found: C, 34.20; H, 3.07; F, 22.73; N, 33.43.

EXAMPLE 10.—(3-METHYLAMINO-6-BROMO-PYRAZINOYL)GUANIDINE

Step A

*Preparation of methyl 3-methylamino-6-bromopyrazinoate.*—3-methylaminopyrazinoic acid (1.5 g., 0.01 mole) is dissolved in methanol (250 ml.) by warming briefly. Hydrogen chloride gas is admitted until the hot solution is saturated and the solution then is refluxed for 2 hours and evaporated to dryness in vacuo. Sufficient saturated sodium bicarbonate is added to produce an approximately neutral solution. The solution is stirred while bromine (0.5 ml., 0.01 mole) is added, dropwise. After the reaction is completed, the product is removed by filtration and dried yielding 1.7 g. (75%), of product, M.P. 171–176° C. After recrystallization from isopropyl alcohol pure methyl 3-methylamino-6-bromopyrazinoate is obtained melting at 181.5–183.5° C.

*Analysis.*—Calculated for $C_7H_8BrN_3O_2$: C, 34.16; H, 3.28; N, 17.07. Found: C, 34.31; H, 3.33; N, 17.15.

Step B

*Preparation of (3 - methylamino - 6-bromopyrazinoyl) guanidine.*—Sodium (0.69 g., 0.03 mole) is dissolved in dry methanol (90 ml.) under anhydrous conditions. The solution is cooled and dry pulverized guanidine hydrochloride (3.01 g., 0.0315 mole) added and the mixture stirred and refluxed for 30 minutes. After cooling and removing the sodium chloride by filtration, the filtrate is treated with methyl 3-methylamino-6-bromopyrazinoate (2 g., 0.0081 mole) and the mixture heated briefly to effect solution, then allowed to stand at room temperature for one hour. The solid that separates is removed by filtration and dried, yielding 1.1 g., (50%) (3-methylamino-6-bromopyrazinoyl)guanidine, M.P. 222–224° C. Purification is carried out by suspending the product in water and dissolving by the addition of hydrochloric acid then filtering and precipitating by the addition of dilute sodium hydroxide, whereupon the product melts at 230.5–231.5° C.

*Analysis.*—Calculated for $C_7H_9BrN_6O$: C, 30.82; H, 3.32; N, 30.77. Found: C, 31.21; H, 3.36; N, 30.52

EXAMPLE 11.—(3-PIPERIDINO-6-BROMOPYRAZINOYL)GUANIDINE

Step A

*Preparation of methyl 3,6-dibromopyrazinoate.*—Methyl 3-amino-6-bromopyrazinoate (23 g., 0.1 mole) is suspended in a mixture of 48% hydrobromic acid (114 ml.) and glacial acetic acid (40 ml.). The solution is stirred and cooled to 5–10° C. and a solution of bromine (15 ml., 0.29 mole) in acetic acid (40 ml.) is added. The mixture is cooled to 0–5° C. and a solution of sodium nitrite (17.4 g., 0.25 mole) in water (30 ml.) added dropwise, and then stirring is continued for another 1.5 hours. With the temperature maintained below 20° C., 10 N sodium hydroxide (200 ml.) is added slowly with stirring, then a saturated solution of sodium bisulfite is added dropwise until the color due to excess bromine disappears. The nearly white product which separates is removed by filtration and dried yielding 17.4 g. (60%) of methyl 3,6-dibromopyrazinoate, M.P. 66–68° C. Recrystallization from a 1:1 ethanol-water mixture did not change the melting point.

*Analysis.*—Calculated for $C_6H_4Br_2N_2O_2$: C, 24.60; H, 1.38; N, 9.56. Found: C, 24.96; H, 1.52; N, 9.46.

Step B

*Preparation of methyl 3-piperidino-6-bromopyrazinoate.*—Methyl 3,6-dibromopyrazinoate (6.0 g., 0.0205 mole) is added gradually with stirring to piperidine (60 ml.) while the temperature is maintained at 25° C. After stirring for an additional 30 minutes, water (120 ml.) is added and the product which separates is removed by filtration and dried yielding 4.5 g. (73%), methyl 3-piperidino-6-bromopyrazinoate, M.P. 88–90° C. Recrystallization from a 1:1 ethanol-water mixture did not change the melting point.

*Analysis.*—Calculated for $C_{11}H_{14}BrN_3O_2$: C, 44.01; H, 4.70; N, 14.00. Found: C, 44.24; H, 4.50; N, 13.95.

Step C

*Preparation of (3-piperidino-6-bromopyrazinoyl)guanidine.*—By replacing the methyl 3-amino-6-chloropyrazinoate employed in Example 1, Step B, by an equimolecular quantity of methyl 3-piperidino-6-bromopyrazinoate and then following substantially the same procedure described in Example 1, Step B, there is obtained an 81% yield of (3-piperidino-6-bromopyrazinoyl)guanidine, M.P. 220–222° C.

*Analysis.*—Calculated for $C_{11}H_{15}BrN_6O$: C, 40.37; H, 4.52; N, 25.68. Found: C, 40.75; H, 4.56; N, 25.45.

EXAMPLE 12.—(3-DIMETHYLAMINO-6-BROMOPYRAZINOYL)GUANIDINE

Step A

*Preparation of methyl 3-dimethylamino-6-bromopyrazinoate.*—Dimethylamine gas (15 g., 0.33 mole) is dissolved in cold methanol (60 ml.). Methyl 3,6-dibromopyrazinoate (6.0 g., 0.021 mole) (from Example 11, Step A) is added and the resulting solution stirred at room temperature for one hour. The addition of water (120 ml.) causes the precipitation of a yellow solid which is removed by filtration and dried yielding 4.0 g. (77%), methyl 3-dimethylamino-6-bromopyrazinoate, M.P. 80–82° C. Recrystallization from a 1:1 ethanol-water mixture did not change the melting point.

*Analysis.*—Calculated for $C_8H_{10}BrN_3O_2$: C, 36.94; H, 3.87; N, 16.15. Found: C, 37.25; H, 3.76; N, 16.13.

Step B

*Preparation of (3-dimethylamino-6-bromopyrazinoyl)guanidine.*—By replacing the methyl 3-amino-6-chloropyrazinoate employed in Example 1, Step B, by an equimolecular quantity of methyl 3-dimethylamino-6-bromopyrazinoate, and following substantially the same procedure described in Example 1, Step B, there is obtained a 30% yield of (3-dimethylamino-6-bromopyrazinoyl)guanidine, M.P. 216–218° C.

*Analysis.*—Calculated for $C_8H_{11}BrN_6O$: C, 33.46; H, 3.86; N, 29.27. Found: C, 33.84; H, 3.83; N, 28.84.

EXAMPLE 13.—[3 - (2 - DIMETHYLAMINOETHYLAMINO) - 6 - CHLOROPYRAZINOYL]GUANIDINE

Step A

*Preparation of methyl 3-bromo-6-chloropyrazinoate.*—By replacing the methyl 3-amino-6-bromo-pyrazinoate employed in Example 11, Step A, by an equimolecular quantity of methyl 3-amino-6-chloropyrazinoate and following substantially the same procedure described in Example 11, Step A, there is obtained 14.2 g. (56%) of methyl 3-bromo-6-chloropyrazinoate, M.P. 35–36° C. This material is sufficiently pure for use in subsequent reactions.

The identity of the above product is established by the conversion of a sample to 3-bromo-6-chloropyrazinamide by the following procedure: The ester obtained by Step A (5 g., 0.02 mole) is added to concentrated aqueous ammonia (50 ml.) and the mixture heated on a steam bath for 30 minutes. After cooling, the solid is separated by filtration and dried, yielding 3.8 g. (80%) of 3-bromo-6-chloropyrazinamide, M.P. 169–171° C. Recrystallization from water did not change the melting point.

*Analysis.*—Calculated for $C_5H_3BrClN_3O$: C, 25.29; H, 1.28; N, 17.77. Found: C, 25.66; H, 1.41; N, 17.38.

Step B

*Preparation of methyl 3-(2-dimethylaminoethylamino)-6 - chloropyrazinoate.*—2 - dimethylaminoethylamine (3.5 g., 0.04 mole) is dissolved in ethanol (25 ml.) and methyl 3-bromo-6-chloropyrazinoate (5.0 g., 0.02 mole) is added with stirring. The solution is refluxed for 30 minutes, cooled and water (75 ml.) added slowly with stirring. The product that separates is removed by filtration and dried, yielding 1.7 g. (33%) of methyl 3-(2-dimethylaminoethylamino) - 6 - chloropyrazinoate, M.P. 105–108° C. This material is used in the next step without further purification.

Step C

*Preparation of [3 - (2 - dimethylaminoethylamino)-6-chloropyrazinoyl]guanidine.*—By replacing the methyl 3-amino-6-chloropyrazinoate employed in Example 1, Step B, by an equimolecular quantity of methyl 3-(2-dimethylaminoethylamino)-6-chloropyrazinoate, and then following substantially the same procedure described in Erample 1, Step B, there is obtained [3-(2-dimethylaminoethylamino) - 6 - chloro - pyrazinoyl]guanidine, M.P. 211–213° C.

*Analysis.*—Calculated for $C_{10}H_{16}ClN_7O$: C, 42.03; H, 5.65; N, 34.31. Found: C, 41.83; H, 5.54; N, 34.24.

EXAMPLE 14.—ETHYLENEBIS - [3 - (3 - AMINO - 6 - CHLORO - 2 - PYRAZINOYL) - GUANIDINE] DIHYDROCHLORIDE

By following substantially the same procedure described in Example 1, Step B, but employing twice the molecular quantity of methyl 3-amino-6-chloropyrazinoate and by replacing the guanidine with an equimolecular quantity of 1,2-guanidinoethane dihydrochloride (prepared by treating 1,2-guanidinoethane sulfate with barium chloride, recrystallizing the product obtained from a methanol-water mixture and drying), there is obtained ethylenebis - [3 - (3 - amino - 6 - chloro - 2 - pyrazinoyl) guanidine] which is converted by substantially the same method described in Example 2 to the dihydrochloride, M.P. 323° C.

*Analysis.*—Calculated for $C_{14}H_{18}Cl_4N_{12}O_2$: C, 31.83; H, 3.44; N, 31.82; Cl, 26.85. Found: C, 32.17; H, 3.54; N, 31.78; Cl, 26.69.

EXAMPLE 15. — 1-(3-ACETAMIDO-6-CHLOROPYRAZINOYL)-2,3-DIPHENYLGUANIDINE

Step A

*Preparation of 3 - amino - 6 - chloropyrazinoic acid.*—Methyl 3-amino-6-chloropyrazinoate, from Example 1, Step A (150 g., 0.8 mole), is added to 800 cc. of 10% sodium hydroxide solution, and the mixture stirred and heated on the steam bath for 1.5 hours. The slurry of the sodium salt of the pyrazinoic acid which results is cooled, the salt collected on a filter and then dissolved in 2400 cc. of boiling water. After filtering, the solution is acidified with concentrated hydrochloric acid, cooled and the product that precipitates collected, washed with water, and dried in a 70° C. oven, yielding 127 g. (92%) of 3 - amino - 6 - chloropyrazinoic acid, M.P. 173.5–175.5° C. (dec.).

Step B

*Preparation of 2-methyl-6-chloro-4-H-pyrazino[2,3-d] [1,3]oxazin-4-one.*—A mixture of 3-amino-6-chloropyrazinoic acid (127 g., 0.73 mole) and acetic anhydride (550 ml.) is stirred and heated one hour on the steam bath. The resulting solution is chilled and the product which crystallizes is collected on a funnel, triturated with ethyl acetate (200 ml.), recollected, and dried to constant weight in a vacuum desiccator yielding 97 g. (67%) of 2 - methyl - 6-chloro-4-H-pyrazino[2,3-d][1,3]-oxazin-4-one, M.P. 155–158° C. (dec.) A further recrystallization from ethyl acetate raises the melting point to 158–160° C. (dec.).

*Analysis.*—Calculated for $C_7H_4ClN_3O_2$: C, 42.55; H, 2.04; N, 21.27. Found: C, 42.59; H, 2.14; N, 21.19.

Step C

*Preparation of 1-(3-acetamido-6-chloropyrazinoyl)-2,3-diphenylguanidine.*—A solution of 2-methyl-6-chloro-4-H-pyrazino-[2,3-d][1,3]oxazin-4-one (6.0 g., 0.03 mole) in boiling ethyl acetate (80 ml.) is mixed with a solution of 1,2-diphenylguanidine (7.6 g., 0.036 mole) in boiling ethyl acetate (50 ml.), and the resulting solution is refluxed 15 minutes. The product which separates is collected and recrystallized from a 2-propanol-dimethylformamide mixture yielding 4.8 g. of 1-(3-acetamido-6-chloropyrazinoyl)-2,3-diphenylguanidine, M.P. 211–212° C. (dec.).

*Analysis.*—Calculated for $C_{20}H_{17}ClN_6O_2$: C, 58.75; H, 4.19; N, 20.56. Found: C, 58.88; H, 4.22; N, 20.49.

EXAMPLE 16.—1-(3-AMINO-6-CHLOROPYRAZINOYL)-2,3-DIPHENYLGUANIDINE

A solution of 1-(3-acetamido-6-chloropyrazinoyl)-2,3-diphenylguanidine, from Example 15, (2.0 g., 0.005 mole) in 5% hydrochloric acid (15 ml.), water (5 ml.) and 2-propanol (12 ml.) is heated 10 minutes on the steam bath and then let stand 20 minutes. The solution is made basic by the addition of 5% sodium hydroxide solution and the product that precipitates is recrystallized from a 2-propanol-dimethylformamide mixture to yield 1.4 g. of 1-(3-amino-6-chloropyrazinoyl)-2,3-diphenylguanidine, M.P. 224–226° C.

*Analysis.*—Calculated for $C_{18}H_{15}ClN_6O$: C, 58.94; H, 4.12; N, 22.91. Found: C, 59.21; H, 4.05; N, 22.98.

EXAMPLE 17.—1-(3-ACETAMIDO-6-CHLOROPYRAZINOYL)-3-BENZYLIDENEAMINOGUANIDINE

A solution of 2-methyl-6-chloro-4-H-pyrazino [2,3-d][1,3]oxazin-4-one from Example 15, Step B, (4.0 g., 0.02 mole) in 2-propanol (100 ml.) is added to a solution of benzylideneaminoguanidine (3.6 g., 0.022 mole) in 2-propanol (25 ml.). The mixture is refluxed 10 minutes and then let cool to room temperature during 40 minutes. The product that precipitates is recrystallized from dimethyl sulfoxide to yield 1.8 g. of 1-(3-acetamido-6-chloropyrazinoyl) - 3-benzylideneaminoguanidine, M.P. 235.5° C. (dec.).

*Analysis.*—Calculated for $C_{15}H_{14}ClN_7O_2$: C, 50.07; H, 3.92; N, 27.26. Found: C, 49.82; H, 3.99; N, 27.40.

EXAMPLE 18.—1-(3-AMINO-6-CHLOROPYRAZINOYL)-3-BENZYLIDENEAMINOGUANIDINE

A solution of 1-(3-acetamido-6-chloropyrazinoyl)-3-benzylideneaminoguanidine from Example 17, (7.8 g., 0.022 mole), 5% hydrochloric acid (50 ml.) and water (25 ml.) is heated 5 minutes on the steam bath, and then chilled to cause the hydrochloride salt of the product to precipitate. The salt is dissolved in hot aqueous 2-propanol and the solution made basic by the addition of 5% sodium hydroxide solution to precipitate the product which is recrystallized from a 2-propanol-dimethylformamide mixture to yield 2.2 g., of 1-(3-amino-6-chloropyrazinoyl)-3-benzylideneaminoguanidine, M.P. 245–246° C. Further recrystallization from the same solvent mixture raises the melting point to 247–248° C.

*Analysis.*—Calculated for $C_{13}H_{12}ClN_7O$: C, 49.13; H, 3.81; N, 30.86. Found: C, 49.29; H, 3.76; N, 30.64.

EXAMPLE 19.—1-(3-ACETAMIDO-6-CHLOROPYRAZINOYL)-3-ACETYLGUANIDINE

Acetylguanidine (10.1 g., 0.1 mole) is added to a refluxing solution of 2-methyl-6-chloro-4-H-pyrazino [2,3-d][1,3]oxazin-4-one, from Example 15, Step B, (14.9 g., 0.75 mole) in ethyl acetate (250 ml.) and refluxing continued for an additional 5 minutes. The product that precipitates is recrystallized from a 2-propanol-dimethylformamide mixture to yield 5.3 g. of 1 - (3 - acetamido-6-chloropyrazinoyl)-3-acetylguanidine, M.P. 194.5–196.0° C.

*Analysis.*—Calculated for $C_{10}H_{11}ClN_6O_3$: C, 40.21; H, 3.71; N, 28.14. Found: C, 40.28; H, 3.60; N, 28.03.

Treatment of the above obtained product with dilute hydrochloric acid by substantially the same procedure described in Example 16 yields (3-amino-6-chloropyrazinoyl)guanidine having the same properties given for it in Example 1.

EXAMPLE 20.—1-(3-ACETAMIDO-6-CHLOROPYRAZINOYL) - 3-ISOPROPYLIDENEAMINOGUANIDINE

Step A

*Preparation of isopropylideneaminoguanidine.*—A solution of aminoguanidine hydrochloride is obtained by adding concentrated hydrochloric acid (25 ml.) to a suspension of aminoguanidine bicarbonate (34 g., 0.25 mole) in water (50 ml.). Acetone (25 ml.) is then added and the solution allowed to stand 20 minutes at room temperature. The solution is chilled and made strongly basic by the addition of 40 g. of sodium hydroxide. The solid product is separated, dissolved in 80 ml. of hot ethanol, the solution filtered and evaporated and the residue recrystallized from cyclohexane-2-propanol to yield 29.5 g. of isopropylideneaminoguanidine, M.P. 104–109° C. This product is used without further purification.

*Analysis.*—Calculated for $C_4H_{10}N_4$: N, 49.09. Found: N, 49.50.

Step B

*Preparation of 1-(3-acetamido-6-chloropyrazinoyl)-3-isopropylideneaminoguanidine.*—By replacing the 1,2-diphenylguanidine employed in Example 15, Step C, by an equimolecular quantity of the above obtained isopropylideneaminoguanidine, and then following substantially the same procedure described in Example 15, Step C, there is obtained a 39% yield of 1-(3-acetamido-6-chloropyrazinoyl)-3-isopropylideneaminoguanidine, which after recrystallization from 2-propanol, melts at 192.5–193.5° C. (dec.).

*Analysis.*—Calculated for $C_{11}H_{14}ClN_7O_2$: C, 42.38; H, 4.53; N, 31.46. Found: C, 42.79; H, 4.47; N, 31.26.

EXAMPLE 21.—1 - (3 - AMINO-6-CHLOROPYRAZINOYL)-3-ISOPROPYLIDENEAMINOGUANIDINE

1 - (3-acetamido-6-chloropyrazinoyl)-3-isopropylideneaminoguanidine, obtained in Example 20, is treated with hydrochloric acid by substantially the same procedure described in Example 16, to give a 33% yield of 1-(3-amino - 6-chloropyrazinoyl)-3-isopropylideneaminoguanidine, which, after recrystallization from 2-propanol, melts at 202.5–204.5° C.

*Analysis.*—Calculated for $C_9H_{12}ClN_7O$: C, 40.08; H, 4.49; N, 36.36. Found: C, 40.20; H, 4.33; N, 36.32.

EXAMPLE 22.—1 - (3-ACETAMIDO-6-CHLOROPYRAZINOYL)-3-BENZOYLGUANIDINE

This compound is prepared by essentially the same method described in Example 19 except that benzoylguanidine is used in place of the acetylguanidine of Example 19, and 2-propanol is used as the reaction solvent in place of ethyl acetate. A 36% yield of product is obtained which, after recrystallization from 2-propanol-dimethylformamide melts at 194.5–196.5° C.

*Analysis.*—Calculated for $C_{15}H_{13}ClN_6O_3$: C, 50.07; H, 3.73; N, 23.52. Found: C, 49.94; H, 3.63; N, 23.30.

EXAMPLE 23.—1 - (3-AMINO-6-CHLOROPYRAZINOYL)-3-BENZOYLGUANIDINE

A solution of 1-(3-acetamido-6-chloropyrazinoyl)-3-benzoylguanidine from Example 22, (5.0 g., 0.014 mole) in 5% hydrochloric acid (40 ml.) and acetic acid (40 ml.) is heated 5 minutes on the steam bath. The solution then is chilled and the hydrochloride salt of the product which precipitates is collected and stirred with a warm 2% sodium bicarbonate solution to yield the product which is recrystallized from aqueous 2-propanol to give 1.3 g., of 1-(3-amino-6-chloropyrazinoyl)-3-benzoylguanidine, M.P. 209.5–211.0° C.

*Analysis.*—Calculated for $C_{13}H_{11}ClN_6O_2$: C, 48.99; H, 3.48; N, 26.37. Found: C, 48.93; H, 3.36; N, 26.38.

EXAMPLE 24.—1 - (3-AMINO-6-CHLOROPYRAZINOYL)-2,3-DIACETYLGUANIDINE

Acetyl chloride (1.9 g., 0.024 mole) is added dropwise during 5 minutes to a suspension of 3-amino-6-chloropyrazinoylguanidine, from Example 1, (2.2 g., 0.01 mole) in pyridine (15 ml.). The mixture is heated 5 minutes on the steam bath, cooled and diluted with 50 ml. of water. The product precipitates and is recrystallized repeatedly from a 2-propanol-dimethylformamide mixture to yield 0.3 g. of 1-(3-amino-6-chloropyrazinoyl)-2,3-diacetylguanidine, M.P. 187.5–188.5° C.

*Analysis.*—Calculated for $C_{10}H_{11}ClN_6O_3$: C, 40.21; H, 3.71; N, 28.14. Found: C, 40.51; H, 3.94; N, 28.06.

EXAMPLE 25.—1-(3-AMINO-6-CHLOROPYRAZINOYL)-3-DIMETHYLAMINOGUANIDINE

Step A

*Preparation of 1-dimethylaminoguanidine hydriodide.*— 5-methylisothiouronium iodide (218 g., 1.0 mole) and unsymmetric-dimethylhydrazine (60.0 g., 1.0 mole) are dissolved in absolute ethyl alcohol (1000 ml.) and heated under reflux 2 hours. The solution is cooled to room temperature and ethyl ether (1000 ml.) added, and the whole cooled to 0–5° C. whereupon 1-dimethylaminoguanidine hydriodide precipitates as a white solid.

Step B

*Preparation of 1-(3-amino-6chloropyrazinoyl) - 3 - dimethylaminoguanidine.*—Sodium metal (2.3 g., 0.10 mole) is dissolved in absolute ethyl alcohol (50 ml). This solution is added to a solution of 1-dimethylaminoguanidine hydriodide (23.0 g., 0.10 mole) in absolute ethyl alcohol (100 ml.) and then added immediately to a previously prepared solution of 2-methyl-6-chloro-4-H-pyrazino[2,3-d][1,3]-oxazin-4 - one from Example 15, Step B (19.8 g., 0.10 mole) in anhydrous ethyl acetate (200 ml.). An orange solid precipitates, is removed by filtration and dissolved in 10% hydrochloric acid (50 ml.). This solution is filtered through charcoal and carefully neutralized with 10% sodium hydroxide solution to pH 7.5 whereupon 1-(3-amino-6-chloropyrazinoyl)-3-dimethylaminoguanidine precipitates as a yellow solid.

TABLE I

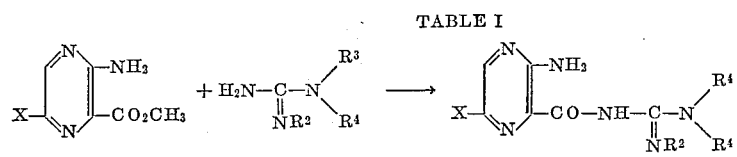

| Ex. No. | X | R² | R³ | R⁴ | Pyrazinoate from Ex. No. | Min. on Steam Bath | Crystallization Solvent |
|---|---|---|---|---|---|---|---|
| 26 | Br | H | CH₃ | CH₃ | 3 | 60 | Dil. HCl-dil. NaOH.ᵃ |
| 27 | Br | —(CH₂)₂— | | H | 3 | 15 | Acetonitrile. |
| 28 | Cl | H | H | CH₃ | 1 | 15 | Dil. HCl-dil. NaOH. |
| 29 | Cl | CH₃ | H | CH₃ | 1 | 15 | Dil. HCl-dil. NaOH. |
| 30 | Cl | H | CH₃ | CH₃ | 1 | 45 | Dil. HCl-dil. NaOH. |
| 31 | Cl | H | H | C₆H₅ | 1 | 20 | Dil. HCl-dil. NaOH. |
| 32 | Cl | H | H | C₆H₅—CH₂ᵇ | 1 | 15 | Dil. HCl-dil. NaOH. |
| 33 | Cl | H | H | C₆H₅—CH₂CH₂ | 1 | 15 | Dil. HCl-dil. NaOH. |
| 34 | Cl | —(CH₂)₃— | | H | 1 | 60 | Acetonitrile. |
| 35 | Cl | —(CH₂)₄— | | H | 1 | 25 | Dil. HCl-dil. NaOH. |
| 36 | Cl | H | | —(CH₂)₅— | 1 | 15 | Dil. HCl-dil. NaOH. |
| 37 | Cl | H | H | 4-Cl—C₆H₄ | 1 | 30 | Dil. HCl-dil. NaOH. |
| 38 | Cl | H | H | —(CH₂)₂N—(CH₂)₂ᶜ | 1 | 50 | Ethanol-H₂O. |
| 39 | Cl | H | H | HOCH₂CH₂ᵈ | 1 | 20 | H₂O. |
| 40 | Cl | H | H | CH₃(CH₂)₃ | CH₃(CH₂)₃ᶠ | 1 | 5 | 2-propanol. |

TABLE I—Continued

End Product

| Ex. No. | Yield, percent | M.P., °C. (dec.) Corr. | Empirical Formula | | Analysis | | | |
|---|---|---|---|---|---|---|---|---|
| | | | | | C | H | N | Cl |
| 26 | 28 | 205.5–206.5 | $C_8H_{11}BrN_6O$ | Calc | 33.46 | 3.86 | 29.27 | |
| | | | | Found | 33.47 | 3.82 | 29.25 | |
| 27 | 72 | 218 | $C_8H_9BrN_6O$ | Calc | 33.70 | 3.18 | 29.45 | Br. 28.03 |
| | | | | Found | 33.95 | 3.20 | 29.75 | Br. 27.78 |
| 28 | 57 | 235–236 | $C_7H_9ClN_6O$ | Calc | 36.77 | 3.97 | 36.76 | |
| | | | | Found | 36.83 | 3.92 | 36.63 | |
| 29 | 20 | 226–227 | $C_8H_{11}ClN_6O$ | Calc | 39.59 | 4.57 | 34.63 | |
| | | | | Found | 39.53 | 4.66 | 34.54 | |
| 30 | 65 | 198–199 | $C_8H_{11}ClN_6O$ | Calc | 39.59 | 4.57 | 34.63 | |
| | | | | Found | 39.45 | 4.47 | 34.21 | |
| 31 | 56 | 215–216 | $C_{12}H_{11}ClN_6O$ | Calc | 49.57 | 3.82 | 28.91 | |
| | | | | Found | 49.48 | 3.85 | 28.98 | |
| 32 | 34 | 208–209 | $C_{13}H_{13}ClN_6O$ | Calc | 51.23 | 4.30 | 27.58 | 11.64 |
| | | | | Found | 51.66 | 4.53 | 27.53 | 11.48 |
| 33 | 33 | 214–215 | $C_{14}H_{15}ClN_6O$ | Calc | 52.75 | 4.74 | 26.37 | |
| | | | | Found | 52.61 | 4.72 | 26.17 | |
| 34 | 45 | 238.5 | $C_9H_{11}ClN_6O$ | Calc | 42.44 | 4.35 | 33.00 | 13.92 |
| | | | | Found | 42.46 | 4.28 | 33.01 | 13.81 |
| 35 | 72 | 225–226.5 | $C_8H_9ClN_6O$ | Calc | 39.93 | 3.77 | 34.92 | 14.73 |
| | | | | Found | 40.27 | 3.67 | 34.88 | 14.69 |
| 36 | 71 | 219–220 | $C_{11}H_{15}ClN_6O$ | Calc | 46.73 | 5.35 | 29.73 | 12.54 |
| | | | | Found | 46.86 | 5.32 | 29.55 | 12.53 |
| 37 | 58 | 227–228 | $C_{12}H_{10}Cl_2N_6O$ | Calc | 44.32 | 3.10 | 25.85 | |
| | | | | Found | 44.30 | 3.13 | 26.05 | |
| 38 | 33 | 167–168 | $C_{15}H_{24}ClN_7O$ | Calc | 50.91 | 6.84 | 27.71 | 10.02 |
| | | | | Found | 51.27 | 6.64 | 27.68 | 10.09 |
| 39 | 59 | 196.5–197.5 | $C_8H_{11}ClN_6O_2 \cdot HCl^e$ | Calc | 32.55 | 4.10 | 28.48 | |
| | | | | Found | 32.57 | 4.14 | 28.42 | |
| 40 | 88 | 143.5–145 | $C_{14}H_{23}ClN_6O$ | Calc | 51.45 | 7.09 | 25.72 | 10.85 |
| | | | | Found | 51.71 | 7.28 | 25.92 | 10.95 |

ª "Dil. HCl-dil. NaOH" indicates product was purified by dissolving in a dilute solution of hydrochloric acid and then reprecipitated as the free base by addition of a dilute solution of sodium hydroxide.
ᵇ Preparation of guanidine intermediate described in Procedure A, below.
ᶜ The 4-position substituent is 2-(1-octahydroazovinyl) ethyl.
ᵈ Preparation of guanidine intermediate described in Procedure B, below.
ᵉ Product converted to its hydrochloride salt by substantially the same method described in Example 2.
ᶠ Preparation of guanidine intermediate described in Procedure C, below.

Procedure A

*Preparation of benzylguanidine hydrochloride employed in the preparation of Example 32 compound.*—A mixture of benzylamine (80.3 g., 0.75 mole) and 2-methyl-2-pseudothiuronium sulfate (69.5 g., 0.25 mole) in water (200 ml.) is allowed to stand at room temperature for 18 hours. Methyl mercaptan is evolved and benzylguanidine sulfate separates as a crystalline precipitate. The salt is collected and dried, yielding 78 g. (0.196 mole) of product, M.P. 203–207° C. The salt is dissolved in boiling water (200 ml.) and a saturated aqueous solution of barium chloride dihydrate (48.8 g., 0.2 mole) is added. The precipitate of barium sulfate is filtered off. The filtrate is evaporated to dryness in vacuo, and the residue, which crystallizes, is recrystallized from aqueous ethanol to give 51.5 g. (55% of theoretical, based on the amount of 2-methyl-2-pseudothiuronium sulfate used) of benzylguanidine hydrochloride, M.P. 175–178° C.

*Analysis.*—Calculated for $C_8H_{11}N_3 \cdot HCl$: N, 22.62. Found: N, 22.45.

Procedure B

*Preparation of (2-hydroxyethyl)guanidine sulfate employed in the preparation of Example 39 compound.*—A solution of 2-methyl-2-pseudothiuronium sulfate (13.9 g., 0.05 mole) and ethanolamine (9.2 g., 0.15 mole) in water (40 ml.) is heated 20 minutes on the steam bath. The solution is evaporated to dryness in vacuo and the syrupy residue is stirred with ethanol to obtain a crystalline product which is recrystallized from aqueous ethanol to yield 12.5 g. of (2-hydroxyethyl)guanidine sulfate, M.P. 127–135° C. (hygroscopic).

*Analysis.*—Calculated for $(C_3H_{10}N_3O)_2SO_4$: C, 23.68; H, 6.63; N, 27.62. Found: C, 23.91; H, 6.48; N, 27.39.

Procedure C

*Preparation of 1,1-dibutylguanidine hydrochloride employed in the preparation of Example 40 compound.*—To a mixture of dibutylamine (64.62 g., 0.5 mole) in water (125 ml.) is added, with cooling, concentrated hydrochloric acid (41 ml., 0.5 mole). Then dibutylamine (6.46 g., 0.05 mole) is added to give a pH of 9.2. The resulting solution is heated to 100° C. and treated, over a period of 3 hours, with 50% cyanamide (65.16 g., 0.775 mole). Heating under reflux is continued for 1 hour longer, after addition is complete. The reaction mixture is concentrated to dryness under reduced pressure. The residual white solid hydrochloride salt is dissolved in water (100 ml.) treated with 1 equivalent of 40% sodium hydroxide solution (50 ml.) and then carbon dioxide gas is bubbled through the solution, with cooling, for 3 hours. The resulting white solid bicarbonate salt is collected, dissolved in warm water (100 ml.) and treated with 1 equivalent of concentrated hydrochloric acid, with stirring. After cooling, the solid is collected and dried yielding 88.8 g. (86%) of 1,1-dibutylguanidine hydrochloride in the form of white crystals, M.P. 101–106° C. Two recrystallizations from water give the product in the form of needles, M.P. 104.5–106° C.

*Analysis.*—Calculated for $C_9H_{21}N_3 \cdot HCl$: C, 52.03; H, 10.67; N, 20.23. Found: C, 52.11; H, 10.20; N, 20.17.

The products of this invention can be administered to man and animals in unit dosage form in pills, tablets, capsules, injectable preparations and the like as in conventional pharmaceutical practice. It will be appreciated that the dosage of each individual compound will vary over a wide range depending upon the relative potency of the selected compound and also depending upon the age and weight of the particular patient to be treated and upon the particular ailment to be treated. For these reasons, tablets, pills, capsules and the like containing for example from 5 to 500 mg. or more or less active ingredient can be made available for the symptomatic adjustment of the dosage to the individual patient. The compounds of this invention can be administered either alone or combined with other therapeutic agents advantageously at a dosage range of from about 5 mg./day to about 1000 mg./day or at a somewhat higher or lower dosage at the physician's discretion, preferably on a 1 to 3 times a day regimen.

Each of the compounds of this invention can be incorporated in a dosage form similar to that described in the following example, or any other of the usual dosage forms suitable for oral or parenteral administration, which can be prepared by well known methods.

EXAMPLE 41.—DRY FILLED CAPSULE CONTAINING 150 MG. OF ACTIVE INGREDIENT

| | Per capsule, mg. |
|---|---|
| (3-amino-6-chloropyrazinoyl)-guanidine | 150 |
| Lactose | 173 |
| Magnesium stearate | 2 |
| Mixed powders | 325 |

Mix the (3-amino-6-chloropyrazinoyl)-guanidine, lactose, and magnesium stearate and reduce to a No. 60 mesh powder. Encapsulate, filling 325 mg. in each No. 2 capsule.

It is also contemplated to combine the compounds of this invention with other diuretic or hypotensive agents or with other therapeutic agents.

While the above examples describe the preparation of certain compounds which are illustrative of the novel compounds of this invention and certain specific dosage forms suitable for administering the novel compounds, it is to be understood that the invention is not to be limited to the specific compounds described in the examples or by the specific reaction conditions described for the preparation of these compounds or by the specific ingredients included in the pharmaceutical preparations, but is to be understood to embrace variations and modifications thereof which fall within the scope of the appended claims.

What is claimed is:

1. (3-amino-6-halopyrazinoyl)guanidine.
2. A compound selected from a pyrazinoylguanidine of the formula

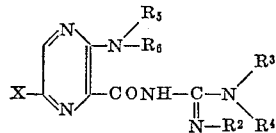

and non-toxic pharmaceutically acceptable salts thereof wherein

X is selected from the group consisting of halogen and trihalomethyl;

$R^2$ is selected from the group consisting of hydrogen, lower alkyl, phenyl, phenyl-lower-alkyl, lower-alkanoyl, benzoyl, and phenyl-lower-alkanoyl;

$R^3$ is selected from the group consisting of hydrogen, lower-alkyl, hydorxy-lower-alkyl, (1-octahydroazocinyl)-lower alkyl, phenyl, phenyl-lower-alkyl, lower alkanoyl, benzoyl, phenyl-lower-alkanoyl, di-lower - alkylamino, lower alkylideneamino, and phenyl-lower-alkylideneamino;

$R^4$ is selected from the group consisting of hydrogen, lower alkyl, and 3-(3-amino-6-halopyrazinoyl)guanidino;

the $R^2$ and $R^3$ lower-alkyl groups can be linked directly together to form a heterocyclic ring with the nitrogen atoms to which they are attached;

the $R^3$ and $R^4$ lower-alkyl groups can be linked directly together to form a heterocyclic ring with the nitrogen atom to which they are attached; and $R^5$ and $R^6$ are each members selected from the group consisting of hydrogen, lower alkanoyl, lower-alkyl, di-lower-alkylamino-lower alkyl, and taken together lower-alkylene.

3. (3-amino-6-halopyrazinoyl)guanidine.
4. (3-amino-6-chloropyrazinoyl)guanidine.
5. 1-(3-amino-6-halopyrazinoyl) - 3 - (lower - alkylideneamino)guanidine.
6. 1 - (3 - amino - 6 - chloropyrazinoyl) - 3 - isopropylideneaminoguanidine.
7. 1 - (3 - amino - 6 - halopyrazinoyl) - 3,3 - (di-lower-alkyl)guanidine.
8. 1 - (3 - amino - 6 - bromopyrazinoyl) - 3,3-dimethylguanidine.
9. 1 - (3 - amino - 6 - bromopyrazinoyl) - 2,3-ethyleneguanidine.
10. 1 - (3 - amino - 6 - halopyrazinoyl) - 3 - (hydroxy-lower-alkyl)guanidine.
11. 1 - (3 - amino - 6 - chloropyrazinoyl) - 3 - (2 - hydroxyethyl)guanidine.
12. A compound of the formula

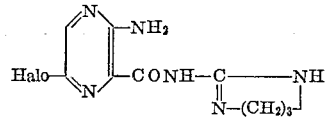

13. A compound of the formula

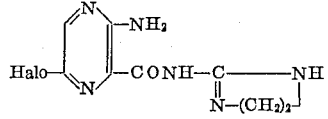

No references cited.

IRVING MARCUS, *Primary Examiner.*